UNITED STATES PATENT OFFICE.

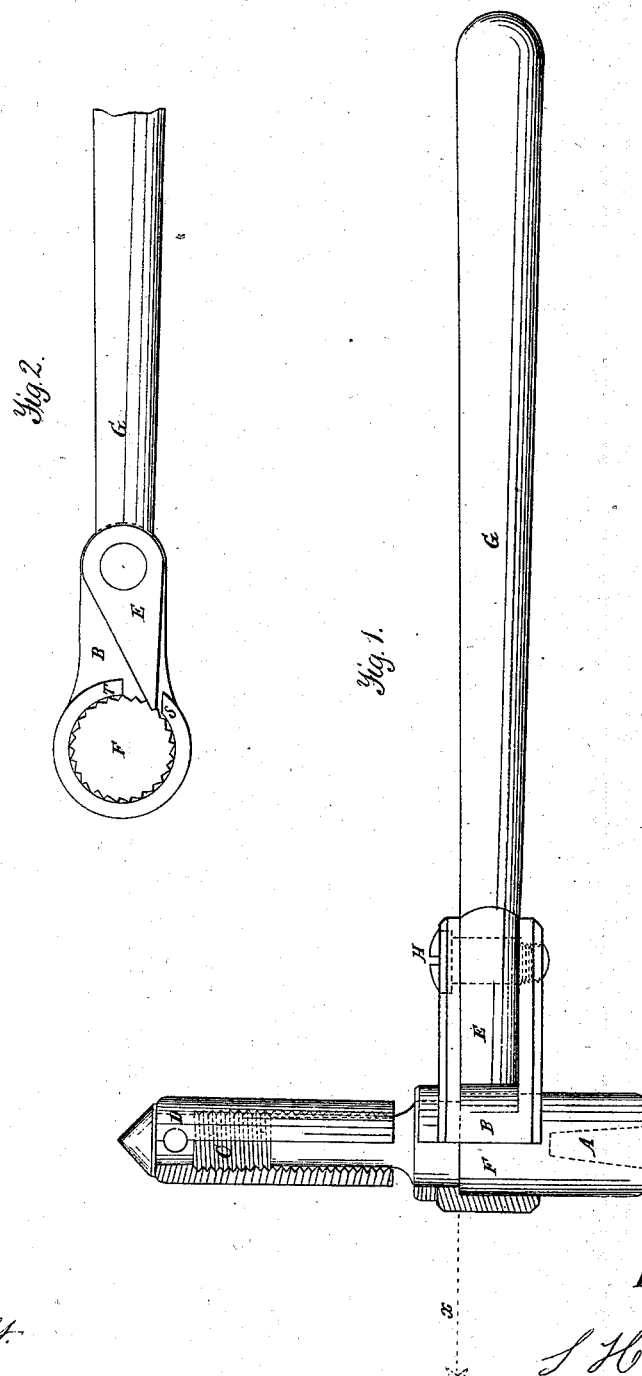

L. H. OLMSTED, OF NEWARK, NEW JERSEY.

IMPROVED RATCHET-BRACE.

Specification forming part of Letters Patent No. 47,446, dated April 25, 1865.

*To all whom it may concern:*

Be it known that I, LEVERETT H. OLMSTED, of the city of Newark, in the county of Essex and State of New Jersey, have invented a new and Improved Ratchet-Brace; and I do hereby declare that the following is a full, clear, and exact description of the same, reference being had to the accompanying drawings, forming a part of this specification, in which—

Figure 1 represents a side elevation of my invention with a part of the nut and frame cut away. Fig. 2 is a horizontal section of the same, taken in the plane indicated by the line $x$, Fig. 1.

Similar letters of reference in the two views indicate corresponding parts.

This invention consists, first, in combining the handle of a ratchet-brace with a frame, said frame being made in one piece, separate from the handle, and is cut away for the purpose of receiving the spindle and handle, and by so cutting it away it forms a shield for the serrated wheel, thereby protecting it from dirt or from any foreign matter, and it being made in one piece it is more durable, and the ratchet-brace is less liable to get out of order. The dog which catches into the serrated wheel is rigidly attached to said handle, and the frame is cut away for the purpose of allowing the dog to come in contact with the serrated wheel. By so cutting the frame away it provides a stop for the dog, so that by moving the handle in one direction the dog will be relieved from the serrated wheel and will come in contact with the frame, thereby permitting the frame and handle to turn back independent of the drill; and by moving the handle in the opposite direction the dog is brought to bear on the circumference of the serrated wheel and thereby causing the drill to rotate with the handle.

The invention consists, second, in making the spindle of a ratchet-brace with the feed-screw cut on the upper part of the stem only, leaving a blank space on the stem between the feed-screw and the frame. The ordinary way is to cut a screw on the whole length of the stem. The spindle and serrated wheel are fastened rigidly together and are held to the frame by a collar, which is fastened to the spindle close to the top of the frame. The blank space is left on the stem of the spindle, between the feed-screw and the frame, for the purpose that when the nut (which is tapped out its whole length) is screwed onto the spindle it covers the feed-screw, thereby protecting it from dirt or any foreign matter, and from the liability to be bruised.

To enable those skilled in the art to make and use my invention, I will proceed to describe it with reference to the drawings.

A represents the spindle of a ratchet-brace, the upper part of which is turned down to form a stem, the lower part being turned to fit loosely into the frame B. Upon the upper part of said stem is cut a screw, (shown at C,) to which the nut D is fitted, and is used for feeding in the drill. Within the frame B, and directly opposite the dog E, and firmly attached to the spindle A, is the serrated wheel F, which serves to impart a rotary motion to the spindle A and to the drill that may be inserted into the same. G is the handle, which has its fulcrum on a pivot, H, and is rigidly connected to the dog E, the point of which is intended to bear on the surface of the serrated wheel and to impart the desired motion to the spindle and drill. When the handle is moved in the opposite direction, the dog is released from the serrated wheel and is brought to bear against the frame at S, Fig. 2, thereby allowing the handle with the frame B to turn back independent of the spindle and drill. It is not necessary that the dog should be brought to bear upon this particular part of the frame at S, Fig. 2, to produce this effect, but the dog E may be made in a form that when the handle is moved in the opposite direction the dog would be brought to bear against the opposite side of the frame at T, Fig. 2.

What I claim as new, and desire to secure by Letters Patent, is—

1. The combination of the frame B and handle G of a ratchet-brace, constructed and arranged substantially as set forth.

2. Making the main spindle of a ratchet-brace with a part of the thread cut away between the socket for the drill and the upper end of the spindle, as shown and described, and for the purpose set forth.

L. H. OLMSTED.

Witnesses:
L. WRIGHT,
A. P. ADAMS.